Feb. 9, 1960 D. P. KINNIBURGH 2,924,141
CABLE CONSTRUCTION
Filed June 7, 1956

INVENTOR.
DONALD P. KINNIBURGH
BY
*Elliot A. Salter*
ATTORNEY

United States Patent Office 2,924,141
Patented Feb. 9, 1960

2,924,141

CABLE CONSTRUCTION

Donald P. Kinniburgh, Seekonk, Mass., assignor, by mesne assignments, to The Crescent Company Inc., Pawtucket, R.I., a corporation of Rhode Island Application June 7, 1956, Serial No. 590,018

4 Claims. (Cl. 87—9)

The present invention relates generally to a cable construction and more particularly to aerial cables and the like.

A primary object of the instant invention is the provision of a flexible electric cable having novel and improved metallic shielding means.

Another object of the instant invention is the provision of metallic shielding for electric cables, which shielding is lighter in weight and less expensive to manufacture than the comparable shieldings heretofore employed.

A further object is the provision of a metallic shielding for aerial cables and the like which, although light in weight and inexpensive to manufacture, nevertheless meets normal electrical requirements and specifications.

Still another object of the instant invention is the provision of a metallic shielding for aerial cables and the like which, although novel and unique in construction, still may be manufactured on automatic braiding machines, such as, for example, the Wardwell Braiding Machine.

A further object is the provision of a cable that may be advantageously utilized in connection with a variety of shielding applications, such as aerial or microphone cables, and which is particularly adaptable for use as automotive radio cable or the like wherein terminals must be applied at one or both ends.

Other objects, features and advantages of the invention will become apparent as the description thereof proceeds when considered in connection with the accompanying illustrative drawings.

In the drawings which illustrate the best mode presently contemplated by me for carrying out my invention:

It has been found desirable to provide a construction for an aerial cable or the like wherein said cable is lighter in weight and less expensive to manufacture than the like cables heretofore utilized. At the same time, it is essential that the cable still meet normal electrical requirements and specifications and that it be sufficiently flexible so as to be convenient for use. Heretofore, electrical cable of this type generally comprised a polyethylene core which carried therein the conductive wire, the wire itself usually being covered with a plastic insulation, such as polyvinyl. Over the polyethylene core it has been normal practice to provide a metallic sheath or shielding which usually takes the form of braided wires of copper or the like. Automatic braiding machines, such as the Wardwell Braiding Machine, are commonly used in the manufacture of this metallic shielding. The cable assembly is completed by the provision of a protective and insulating covering over the metallic shielding, which covering preferably, although not necessarily, is constructed of a polyvinyl.

The conventional copper braid which has heretofore bene utilized in connection with the metallic shielding above described has proven to result in a somewhat heavy and expensive-to-manufacture cable construction. Furthermore, the copper braiding appreciably reduces the flexibility of the completed cable assembly. Therefore, in accordance with this invention, there has been provided a novel and improved metallic shielding for use in connection with electrical cables of the character described, which shielding is not only light in weight and less expensive in manufacture, but also is substantially as effective from an electrical standpoint as the shieldings heretofore used. My new construction further results in a cable of extreme flexibility.

Thus there has been provided a metallic shielding which instead of being constructed entirely of braided metallic wire is constructed wholly or in part of spirally wound metallic foil strips. For reasons hereinafter to be set forth in detail, it has been found desirable to combine the metallic foil strip with a spirally wound wire to arrive at the completed shielding.

Figure 1:
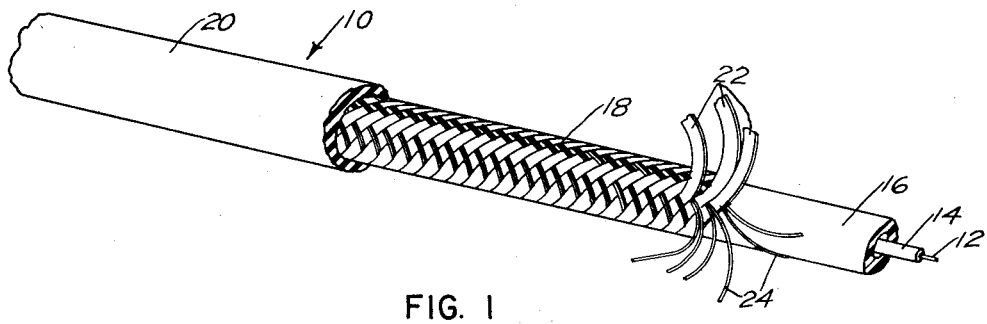
Fig. 1 is a perspective view of a cable embodying my improved metallic shielding, parts being broken away and the shielding somewhat unraveled for purposes of illustration.

Referring now to the drawings, there is shown in Fig. 1 a cable 10 comprising conductive wire 12 which may be covered with polyvinyl insulation 14 if desired. The wire 12 and its insulation extend longitudinally through a hollow polyethylene core 16 which in turn is covered by metallic shielding 18. The cable assembly is completed by a protective outer covering 20 of insulating material, such as a polyvinyl. It will be noted that the shielding 18 is constructed of a spirally wound metallic foil strip 22, preferably of aluminum. Cooperating with the strip 22 are spirally wound wires 24, preferably of copper, it being noted that the strip 22 and the wires 24 are interlaced to provide an interlocking braid. Where the strip 22 is constructed of aluminum and the wires 24 of copper, it is preferable to tin the latter in order to prevent any chemical reaction from taking place between the copper and aluminum.

Use of the shield 18 as above described results in extremely effective covering of the cable. The normal covering requirement is usually somewhere within the range of 80 to 98 percent covering, and it will be obvious that utilization of the spirally wound strip 22 will provide better and more complete covering of the cable than where the shield is constructed entirely of braided wire. Furthermore, the shielding 18 may be manufactured on conventional braiding machines. During such manufacture, and reference is now being made to a conventional Wardwell Braiding Machine of the 16-carrier type, it has been found that the material running from the bottom set of carriers is subjected to a greater stress. Thus when experimentation was conducted in an effort to provide a shielding constructed entirely of braided metallic foil strips, it was found that the strips running on the bottom set of rollers would continually break after short periods of operation of the machine. For this reason, it has been found desirable to combine metallic foil strips with copper wire or the like, it being understood that the wire, having the greater resistance against breakage, will be run on the bottom carriers of the braiding machine.

Figure 2:
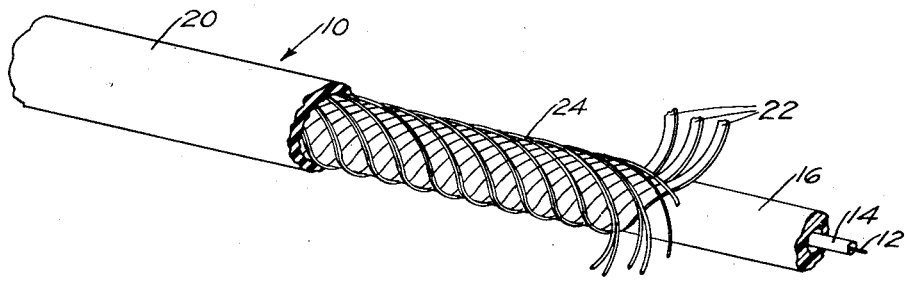
Fig. 2 is a perspective view of a slightly modified form of my invention.

In Fig. 2 there is shown a slightly modified form of my invention wherein instead of interlocking the metallic foil strip 22 with the wires 24, the latter are simply spirally wound over the former in overlapping relation. This form is slightly easier and less expensive to manufacture, but as will be obvious, the resulting shielding is not quite so tightly wound and effective as is the case in connection with my preferred form shown in Fig. 1. Each of these forms, however, results in a shielding that is considerably lighter than the conventional copper braid shielding heretofore utilized. For example, it has been found that the conventional copper shielding weighs approximately 17 pounds per 1000 feet. For the same length of shielding, it has been found that the form of my invention disclosed in Fig. 1 utilizes approximately 3.3 pounds of copper and 1.3 pounds of aluminum foil, while the form of my invention disclosed in Fig. 2 utilizes approximately 1.76 pounds of copper and 1.52 pounds of aluminum foil.

Figure 3:
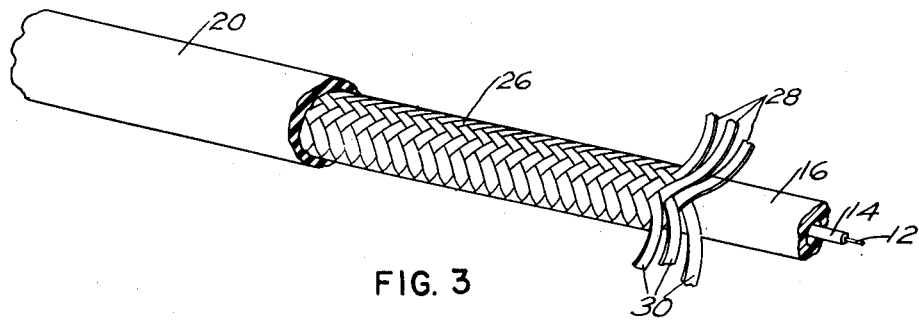
Fig. 3 is a perspective view of still another modification.
Figure 4:
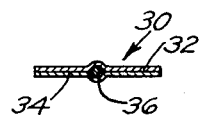
Fig. 4 is a cross-sectional view of one of the strips utilized in the construction of Fig. 3.

Referring now to Fig. 3, there is shown still another modification of the instant invention wherein the shielding 26 is constructed entirely of spirally wound metallic foil strips. Thus aluminum foil strips 28 and 30 are interlaced on a conventional braiding machine to arrive at the interlocking braid shown. Since, as aforedescribed, the foil running on the bottom set of carriers on the conventional braiding machine is subjected to greater stress, it has been found desirable to reinforce this particular strip, which in this case is the strip 30. Thus the strip 30 is constructed of laminated foil strip sections 32 and 34, which sections have therebetween a longitudinally extending reinforcing strand 36, preferably of Fiberglas or the like, note Fig. 4. Although only one reinforcing strand 36 has been disclosed, it will be understood that a plurality of spaced longitudinally extending strands may be utilized if necessary or desirable. Whereas in practice the metallic foil strips 22 and 28 are preferably 3/64" wide and .002" thick, it will be understood that the strip sections 32 and 34 are somewhat thinner whereby the laminated strip 30 will not be appreciably thicker than the above noted dimension.

Thus there has been provided in accordance with the instant invention a metallic shielding that is relatively light in weight, inexpensive to manufacture, and which yet results in highly effective covering of the cable from an electrical standpoint. Since the completed cable assembly is relatively flexible, and also since the braid may be easily stripped back at either end of the cable, my invention has proven highly useful in connection with automotive radio cable or the like wherein the cable must usually be coiled within a small area and further wherein terminals must usually be applied to one or both ends of the cable.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A metallic shielding for flexible cables and the like, having oppositely disposed spiral windings, one of said windings comprising a metallic foil strip, and the other of said windings comprising a metallic filamentous strand, said windings being interlaced to form an interlocking braid.

2. A metallic shielding for flexible cables and the like, having oppositely disposed, spirally wound metallic foil strips, said strips being interlaced to provide an interlocking braid, and at least one of said strips having longitudinally extending reinforcing means, said reinforcing means comprising a metallic filamentous strand.

3. In the metallic shielding of claim 2, said reinforced strip being constructed of laminated strip sections having said filamentous strand therebetween.

4. A metallic shielding for flexible cables and the like, having oppositely disposed spiral windings, one of said windings comprising a metallic foil strip, said strip being helically wound with its longitudinal edges in abutting relation so as to effect a substantially complete shield, and the other of said windings comprising a metallic filamentous strand, said windings being interlaced to form an interlocking braid.

References Cited in the file of this patent

UNITED STATES PATENTS

| Number | Name | Date |
|---|---|---|
| 243,180 | Ware | June 21, 1881 |
| 571,539 | Sawyer | Nov. 17, 1896 |
| 988,099 | Hoffstrom | Mar. 28, 1911 |
| 1,923,859 | Boggs | Aug. 22, 1933 |
| 2,111,639 | Petersen | Mar. 22, 1938 |
| 2,447,168 | Dean et al. | Aug. 17, 1948 |
| 2,488,527 | Dutcher | Nov. 22, 1949 |
| 2,514,905 | Solero | July 11, 1950 |
| 2,526,942 | Fuchs | Oct. 24, 1950 |
| 2,614,172 | Greenfield et al. | Oct. 14, 1952 |

FOREIGN PATENTS

| Number | Country | Date |
|---|---|---|
| 84,026 | Sweden | Aug. 6, 1935 |